(12) United States Patent
Hung

(10) Patent No.: US 11,815,221 B2
(45) Date of Patent: Nov. 14, 2023

(54) JOINT DEVICE OF A SUPPORT FRAME

(71) Applicant: MODERNSOLID INDUSTRIAL CO., LTD., Taichung (TW)

(72) Inventor: Chin-Jui Hung, Taichung (TW)

(73) Assignee: Modernsolid Industrial Co., Ltd., Taichung (TW)

( * ) Notice: Subject to any disclaimer, the term of this patent is extended or adjusted under 35 U.S.C. 154(b) by 9 days.

(21) Appl. No.: 17/695,421

(22) Filed: Mar. 15, 2022

(65) Prior Publication Data

US 2022/0299156 A1  Sep. 22, 2022

(30) Foreign Application Priority Data

Mar. 17, 2021  (TW) .................................. 110109542

(51) Int. Cl.
*F16M 11/20* (2006.01)

(52) U.S. Cl.
CPC ... *F16M 11/2021* (2013.01); *F16M 2200/022* (2013.01); *Y10T 403/32319* (2015.01)

(58) Field of Classification Search
CPC ..... Y10T 403/32254; Y10T 403/32262; Y10T 403/32319; Y10T 403/32327; Y10T 403/32401; Y10T 403/32409; Y10T 403/32418; Y10T 403/32426; Y10T 403/32434; F16M 11/10; F16M 11/2021; F16M 2200/022; F16M 2200/041; F16M 2200/044
See application file for complete search history.

(56) References Cited

U.S. PATENT DOCUMENTS

| 3,989,283 | A | | 11/1976 | Pepper | |
|---|---|---|---|---|---|
| 4,770,384 | A | * | 9/1988 | Kuwazima | .............. F21V 21/26 248/281.11 |
| 4,969,232 | A | * | 11/1990 | Michel | ................ B60B 33/0002 16/350 |

(Continued)

FOREIGN PATENT DOCUMENTS

| CN | 106838569 A | 6/2017 |
|---|---|---|
| CN | 106838569 B | 7/2019 |

OTHER PUBLICATIONS

Search Report appended to an Office Action, which was issued to Taiwanese counterpart application No. 110109542 by the TIPO on Oct. 8, 2021, with an English translation thereof.

(Continued)

*Primary Examiner* — Jonathan Liu
*Assistant Examiner* — Guang H Guan
(74) *Attorney, Agent, or Firm* — Burris Law, PLLC

(57) ABSTRACT

A joint device includes a rotating seat unit and a rotary shaft unit. The rotary shaft unit includes a fixed block defining a tightening hole, a rotary shaft fixed to the rotating seat unit and inserted into the tightening hole, and a tightening ring that is press-fitted into the tightening hole, that is frictionally engaged with the rotary shaft and that has large and small diameter ends. The rotary shaft is rotatable with the rotating seat unit relative to the fixed block. The tightening ring has a C-shaped body with a gap between two ends thereof. The gap of the tightening ring gradually reduces when it is gradually inserted from the large to the small diameter end of the tightening hole.

7 Claims, 14 Drawing Sheets

(56) References Cited

U.S. PATENT DOCUMENTS

| | | | | |
|---|---|---|---|---|
| 5,179,447 | A * | 1/1993 | Lain | A47C 7/723 |
| | | | | 348/827 |
| 5,996,954 | A * | 12/1999 | Rosen | B60R 11/0235 |
| | | | | 248/278.1 |
| 6,487,882 | B2 * | 12/2002 | Trempala | A62C 35/68 |
| | | | | 403/370 |
| 7,261,272 | B2 * | 8/2007 | Courbon | B60R 1/076 |
| | | | | 248/478 |
| 7,317,611 | B2 * | 1/2008 | Dittmer | F16M 11/10 |
| | | | | 248/917 |
| 8,152,124 | B2 * | 4/2012 | Branham | B60R 1/06 |
| | | | | 359/872 |
| 9,732,901 | B2 * | 8/2017 | Satterfield | F16M 13/02 |
| 11,365,009 | B2 * | 6/2022 | Gilbert | B64D 11/0639 |
| 11,629,812 | B2 * | 4/2023 | Freienmuth | F16M 13/02 |
| | | | | 248/183.1 |
| 2014/0001331 | A1 | 1/2014 | Oddsen, Jr. et al. | |
| 2022/0299155 | A1 * | 9/2022 | Hung | F16M 11/2064 |
| 2022/0299156 | A1 * | 9/2022 | Hung | F16M 11/18 |

OTHER PUBLICATIONS

Search Report appended to an Office Action, which was issued to Chinese counterpart application No. 202210226733.1 by the CNIPA dated Jun. 14, 2023, with an English translation thereof.

* cited by examiner

JOINT DEVICE OF A SUPPORT FRAME

CROSS-REFERENCE TO RELATED APPLICATION

This application claims priority to Taiwanese Patent Application No. 110109542, filed on Mar. 17, 2021.

FIELD

The disclosure relates to a component of a support frame, and more particularly to a joint device of a support frame.

BACKGROUND

Referring to FIGS. 1 and 2, a microphone support frame 1, as disclosed in Chinese Patent No. CNB205579086U, includes a fixed rod 11, two lower arms 12, two upper arms 13 and a movable rod 14. Each of the lower and upper arms 12, 13 has a lower end and an upper end. The lower ends of the lower arms 12 are pivotally connected to the fixed rod 11, while the upper ends thereof are pivotally connected to the lower ends of the upper arms 13. The movable rod 14 is used for fixing a microphone 9, and is rotatably and pivotally connected to the upper ends of the upper arms 13. As shown in FIG. 1, an angle (θ1) is formed between the lower arm 12 and the fixed rod 11, an angle (θ2) is formed between the lower arm 12 and the upper arm 13, and an angle (θ3) is formed between the movable rod 14 and the upper arm 13. Through this, three movable joints 15 are formed, and three threaded bolts 16 are respectively connected to the movable joints 15. When the threaded bolts 16 are loosened, the angles (θ1, θ2, θ3) can be adjusted, and after the adjustment, the threaded bolts 16 are tightened to fix the angles (θ1, θ2, θ3).

However, during adjustment of the angles (θ1, θ2, θ3), the threaded bolts 16 are loosened one by one, and are tightened also one by one to fix the angles (θ1, θ2, θ3), so that the aforesaid microphone support frame 1 is inconvenient to use, and needs an improvement.

SUMMARY

Therefore, an object of the present disclosure is to provide a joint device that is easy to use.

According to this disclosure, a joint device is configured to be rotatably disposed between at least two support arms of a support frame, and comprises a rotating seat unit and a rotary shaft unit. The rotating seat unit is configured to be connected to one of the support arms and is configured to be rotatable relative to the other one of the support arms about a rotation axis. The rotary shaft unit has one end fixedly connected to the rotating seat unit, and the other end configured to be connected to the other one of the support arms. The rotary shaft unit includes a fixed block, a rotary shaft and a tightening ring. The fixed block is configured to be inserted into the other one of the support arms, and has an inner wall surface surrounding the rotation axis and defining a tightening hole. The tightening hole has a tapered section with large and small diameter ends. The small diameter end has a diameter smaller than that of the large diameter end. The rotary shaft is fixed to the rotating seat unit, is inserted into the tightening hole, and is rotatable with the rotating seat unit relative to the fixed block about the rotation axis. The tightening ring is sleeved on the rotary shaft and is press-fitted into the tapered section of the tightening hole. The tightening ring has a C-shaped body with a gap between two ends thereof. The tightening ring has a shape matching that of the tapered section of the tightening hole, and has an inner annular surface frictionally engaged with the rotary shaft, and an outer annular surface radially opposite to the inner annular surface and pressed against the inner wall surface of the fixed block. The gap of the tightening ring gradually reduces when the tightening ring is gradually inserted from the large to the small diameter end of the tightening hole.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
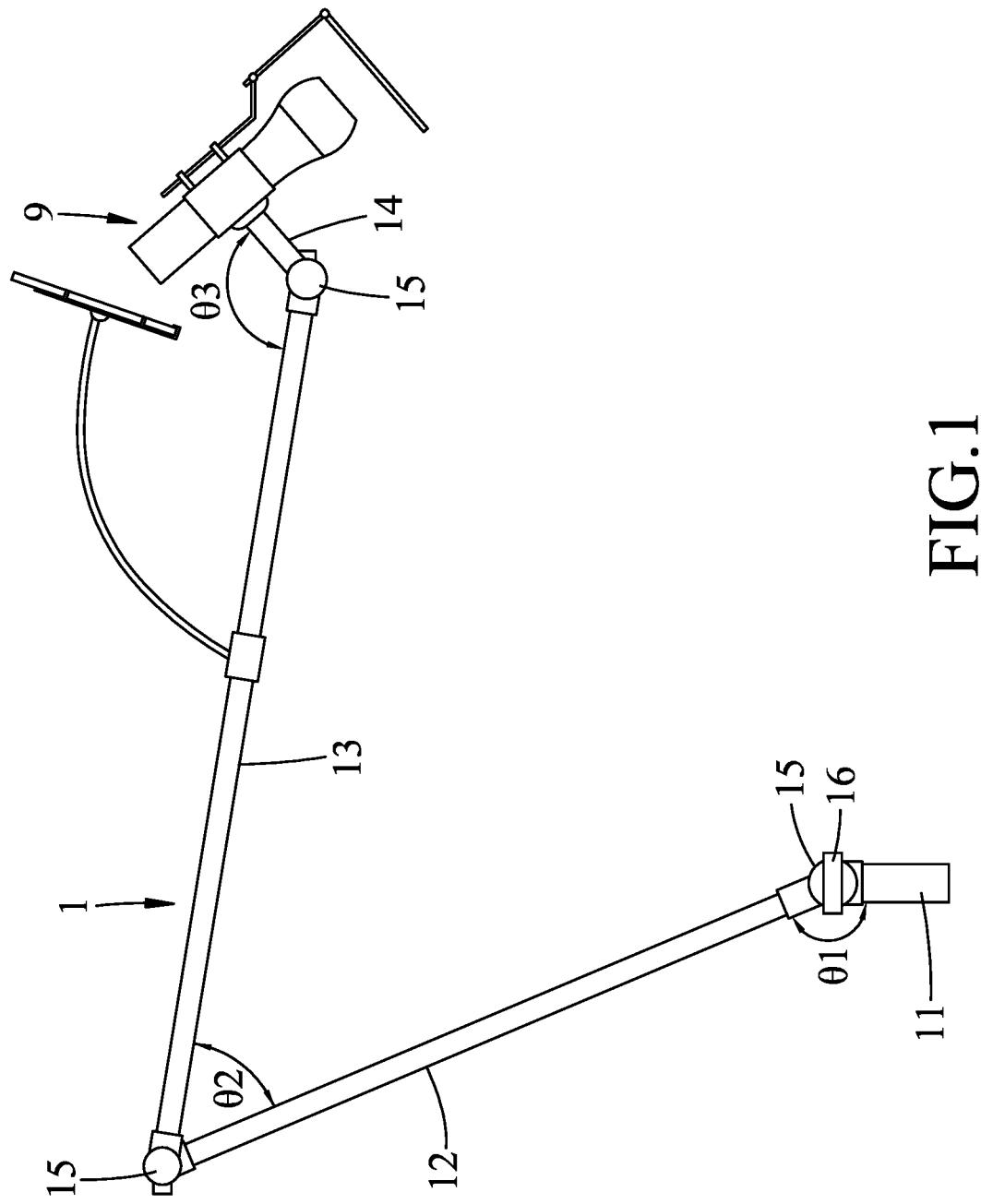
FIG. 1 is a side view of a microphone support frame disclosed in Chinese Patent No. CNB205579086U.
Figure 2:
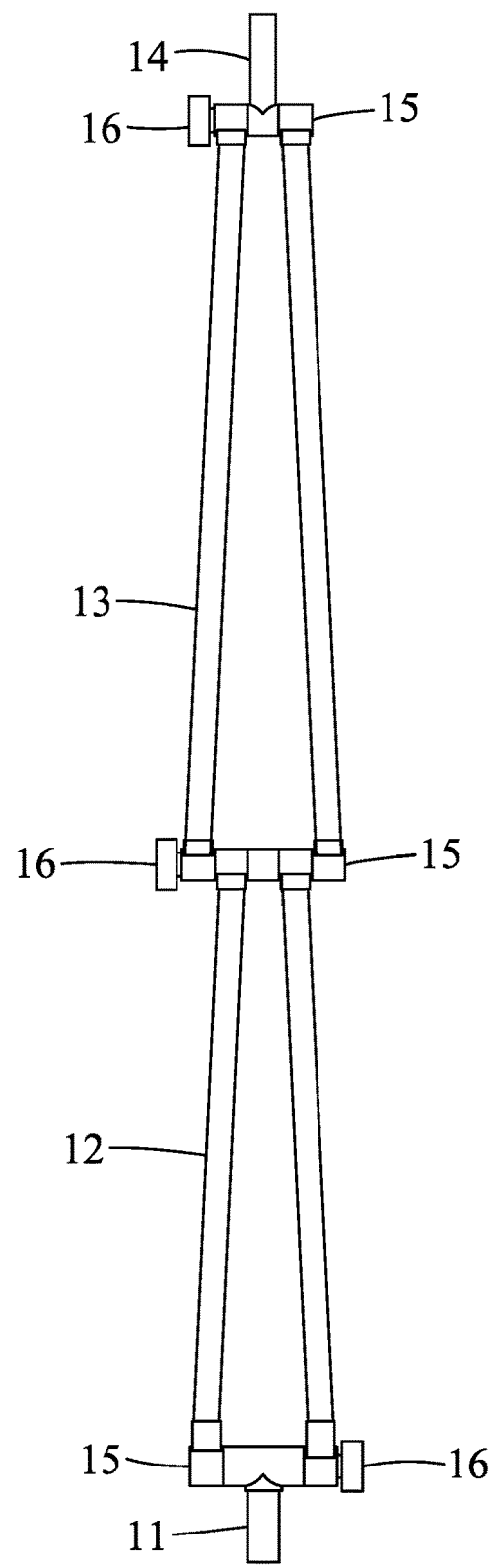
FIG. 2 is a fragmentary top view of the microphone support frame of FIG. 1.
Figure 3:
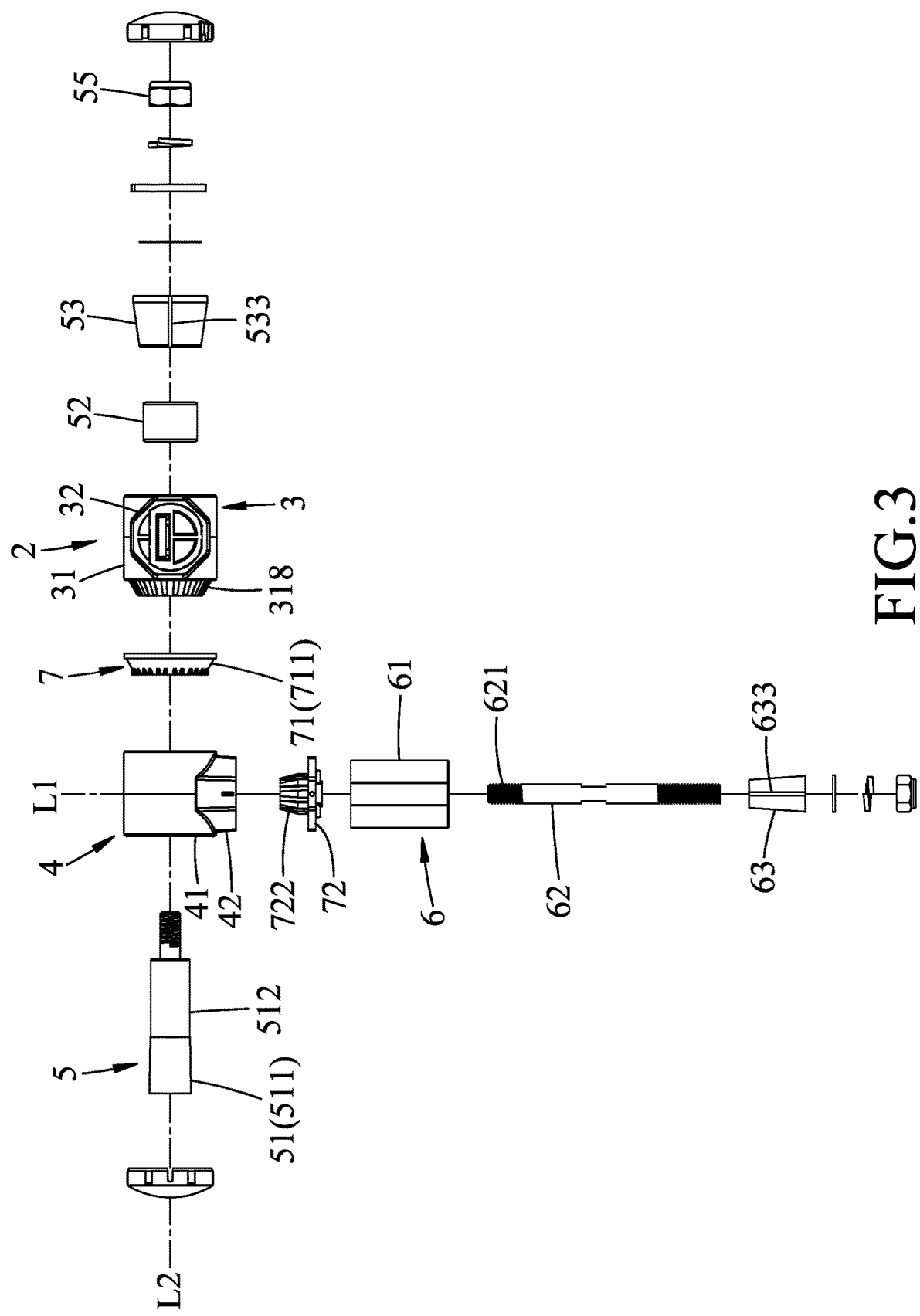
FIG. 3 is an exploded side view of a joint device according to an embodiment of the present disclosure.
Figure 4:
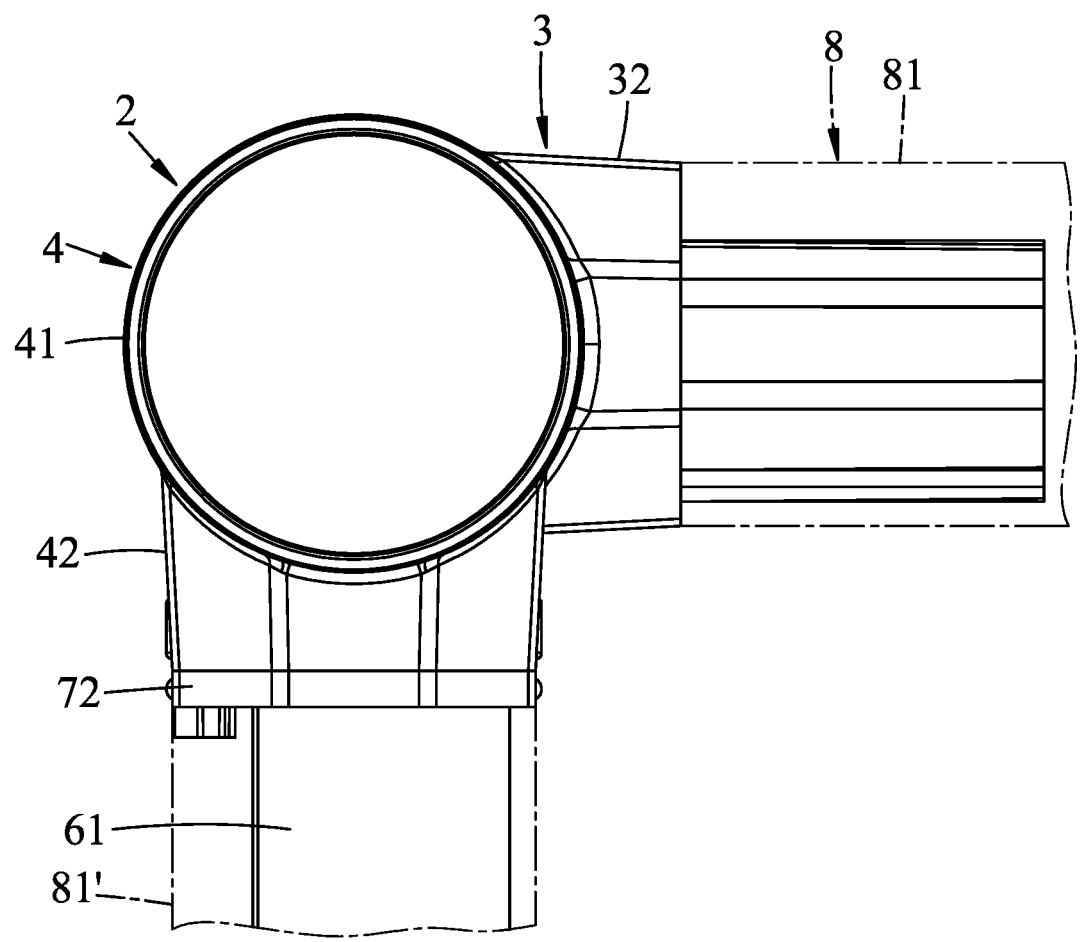
FIG. 4 is an assembled side view of the embodiment, illustrating how the embodiment is disposed between two support arms of a support frame.
Figure 5:
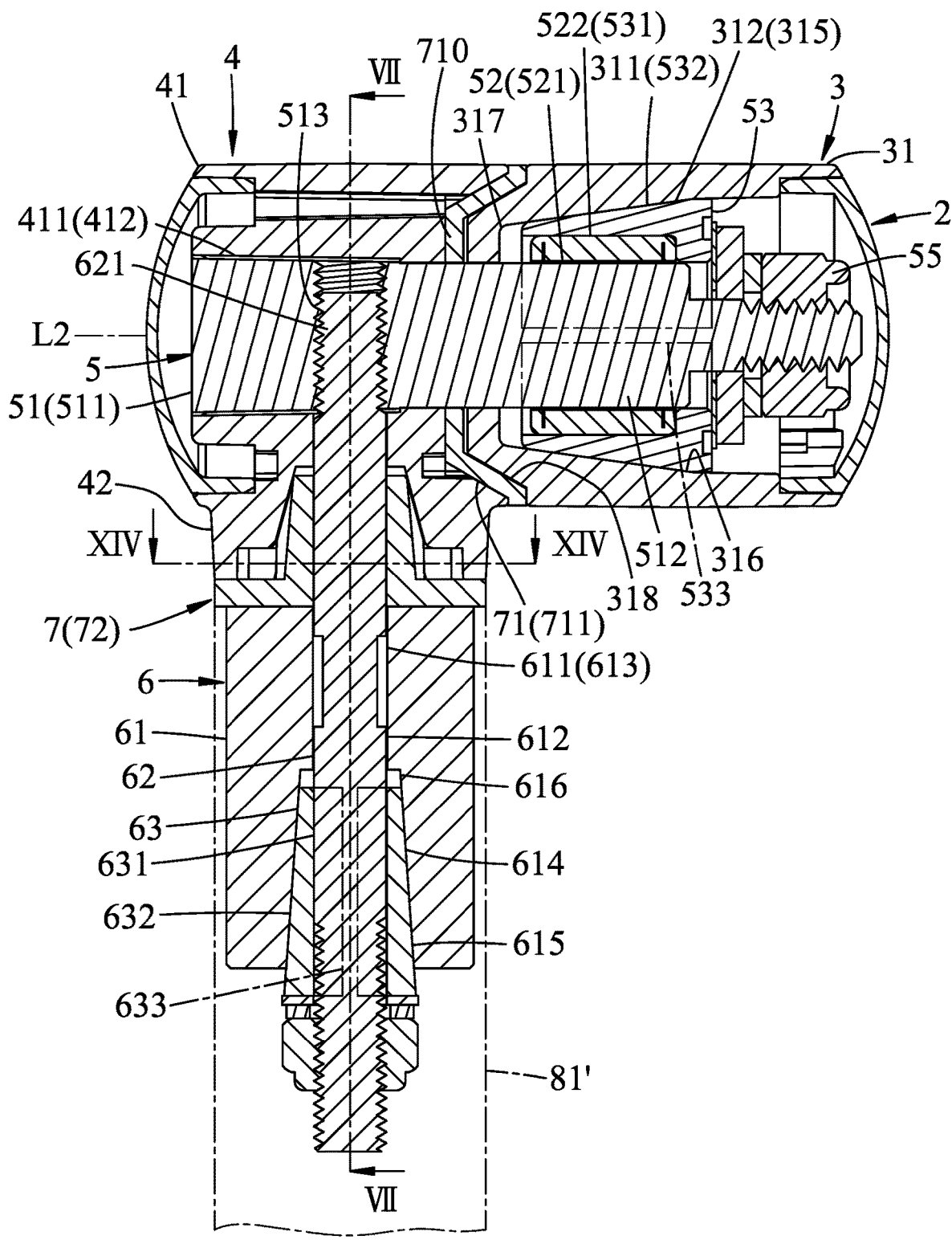
FIG. 5 is an assembled sectional view of the embodiment.

Referring to FIGS. 3 to 5, a joint device according to an embodiment of the present disclosure is configured to be rotatably disposed between two support arms 81, 81' of a support frame 8. The support arm 81 is used for fixing a microphone, a display or other items. Through the provision of the joint device, angle of use of the microphone, the display or the other items can be adjusted accordingly. In this embodiment, the joint device of this disclosure includes a rotating seat unit 2, a shaft assembly 5, a rotary shaft unit 6, and a resistance unit 7.

The rotating seat unit 2 is configured to be connected to the support arm 81, and is configured to be rotatable relative to the support arm 81' about a rotation axis (L1). The rotation axis (L1) extends in a top-bottom direction. The rotating seat unit 2 defines a joint axis (L2) extending in a left-right direction and perpendicular to the rotation axis (L1). The rotating seat unit 2 includes a casing seat 3 surrounding the joint axis (L2) and configured to be connected to the support arm 81, and a rotating seat 4 connected to the casing seat 3 along the joint axis (L2). The rotating seat 4 and the casing seat 3 are rotatable relative to each other about the joint axis (L2).

Figure 6:
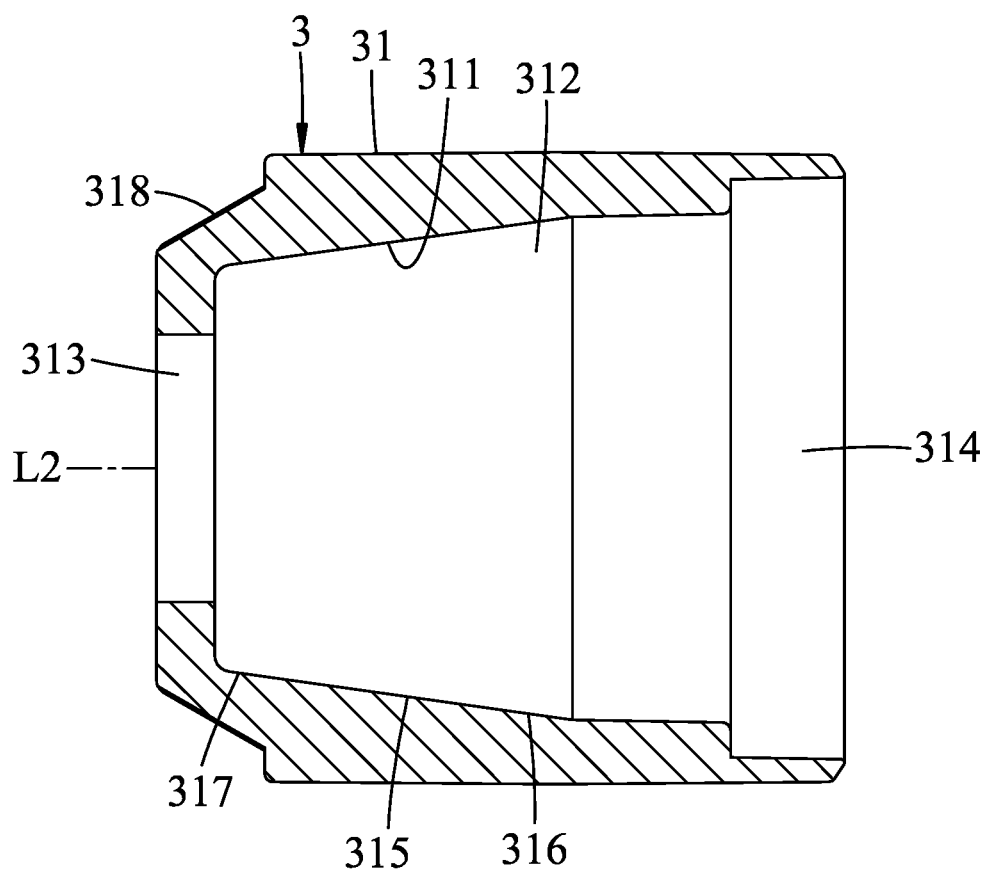
FIG. 6 is a sectional view of a casing seat of the embodiment.

Referring to FIG. 6, in combination with FIGS. 4 and 5, the casing seat 3 includes a tubular portion 31 surrounding the joint axis (L2), and a connecting portion 32 extending outwardly from an outer surface of the tubular portion 31 for connection with the support arm 81. The tubular portion 31 has an inner surface 311 surrounding the joint axis (L2) and defining a mounting hole 312 that extends through opposite left and right ends thereof. The mounting hole 312 has an inner portion 313, an outer portion 314 opposite to the inner portion 313 along the joint axis (L2) and having a step shape, and a tapered portion 315 between the inner and outer portions 313, 314. The tapered portion 315 has a large diameter end 316 and a small diameter end 317 opposite to each other along the joint axis (L2). The large diameter end 316 is adjacent to the outer portion 314, and has a diameter smaller than a smallest diameter of the outer portion 314. The small diameter end 317 is adjacent to the inner portion 313, and has a diameter smaller than that of the large diameter end 316, but larger than a diameter of the inner portion 313.

Figure 7:
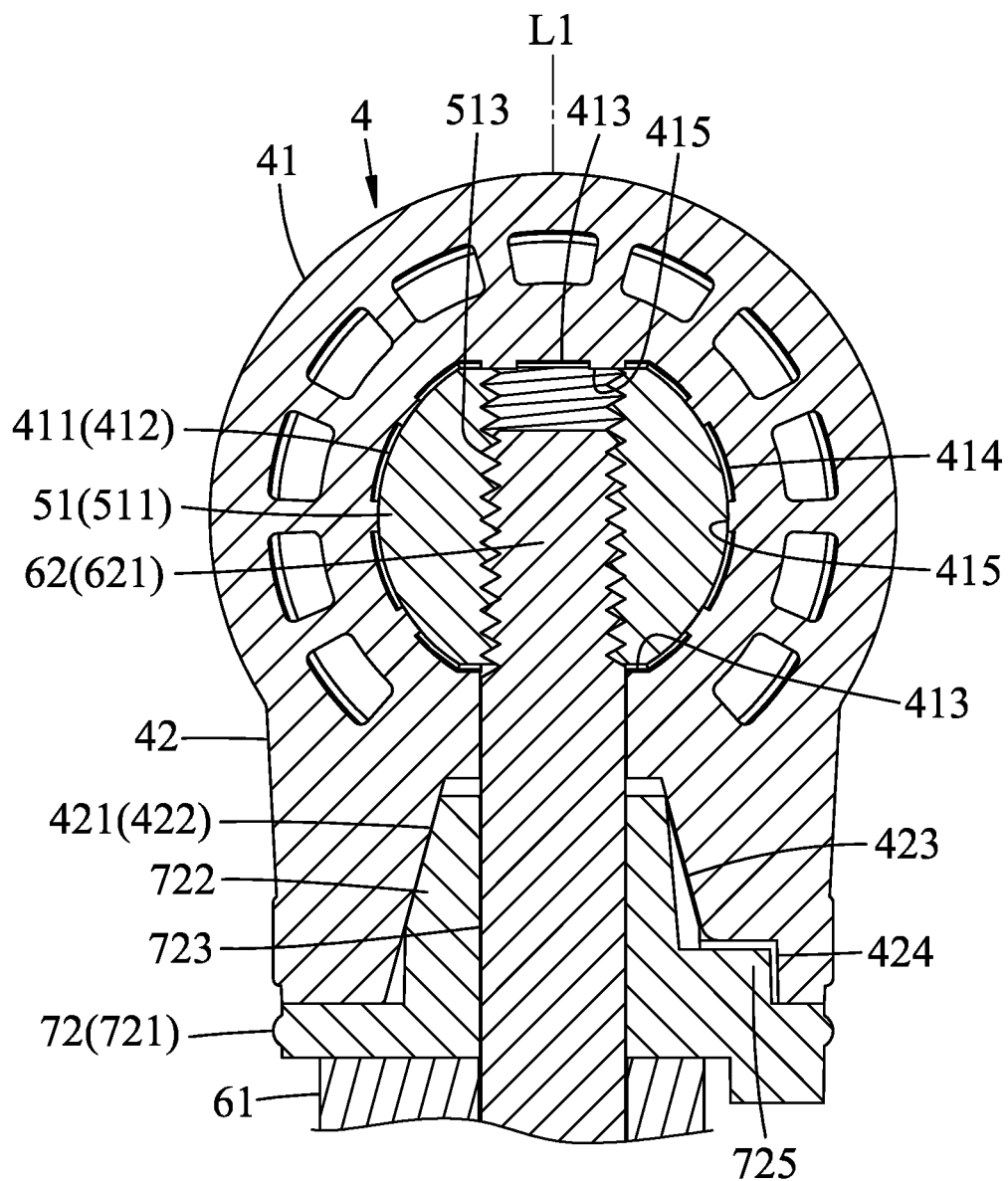
FIG. 7 is a sectional view taken along line VII-VII of FIG. 5.

Referring to FIG. 7, in combination with FIGS. 3 and 5, the rotating seat 4 includes a rotating seat body 41 surrounding the joint axis (L2), and a rotating portion 42 extending outwardly from an outer surface of the rotating seat body 41. The rotating seat body 41 has an inner surface 411 surrounding the joint axis (L2) and defining a positioning hole 412. The positioning hole 412 spatially communicates with the mounting hole 312. In this embodiment, the inner surface 411 includes two flat surfaces 413 radially opposite to each other, two curved surfaces 414 radially opposite to each other and connected between the flat surfaces 413, and a plurality of spaced-apart ribs 415 formed on and arranged around the flat and curved surfaces 413, 414. However, in other variations, the positioning hole 412 may be a polygonal hole, an irregular hole or other non-circular hole. The rotating portion 42 has an inner surrounding surface 422 surrounding the rotation axis (L1) and defining a receiving groove 421.

The shaft assembly 5 includes a rotating shaft 51, a one-way bearing 52, a tightening member 53, and a nut 55.

The rotating shaft 51 extends into the rotating seat 4 and the casing seat 3 along the joint axis (L2), and is rotatable with the rotating seat 4 relative to the casing seat 3 about the joint axis (L2). The rotating shaft 51 has a linking section 511 connected to the positioning hole 412 and having a shape matching that of the positioning hole 412, and an extending section 512 extending from the linking section 511 into the mounting hole 312. The linking section 511 has a threaded hole 513 extending in the rotation axis (L1). With the linking section 511 connected to the non-circular positioning hole 412, the rotating shaft 51 can be fixed to the rotating seat 4 to rotate therewith. Further, with the linking section 511 abutting against the ribs 415 on the inner surface 411 of the rotating seat body 41, removal of the rotating shaft 51 from the rotating seat 4 can be prevented, thereby increasing the positioning effect thereof.

The one-way bearing 52 is sleeved on the extending section 512 of the rotating shaft 51, and is located in the tapered portion 315 of the mounting hole 312. The one-way bearing 52 has an inner friction surface 521 frictionally engaged with the extending section 512, and an outer friction surface 522 radially opposite to the inner friction surface 521.

The tightening member 53 is inserted into the tapered portion 315 of the mounting hole 312, and is press-fitted between the inner surface 311 of the tubular portion 31 and the one-way bearing 52. The tightening member 53 has a C-shaped body with a gap 533 between two ends thereof. The tightening member 53 has an inner peripheral surface 531 frictionally engaged with the outer friction surface 522 of the one-way bearing 52, and an outer peripheral surface 532 radially opposite to the inner peripheral surface 531 and pressed against the inner surface 311 of the tubular portion 31.

The nut 55 is threadedly connected to a threaded portion of the extending section 512 of the rotating shaft 51 so as to prevent removal of the one-way bearing 52 and the tightening member 53 from the rotating shaft 51.

Figure 8:
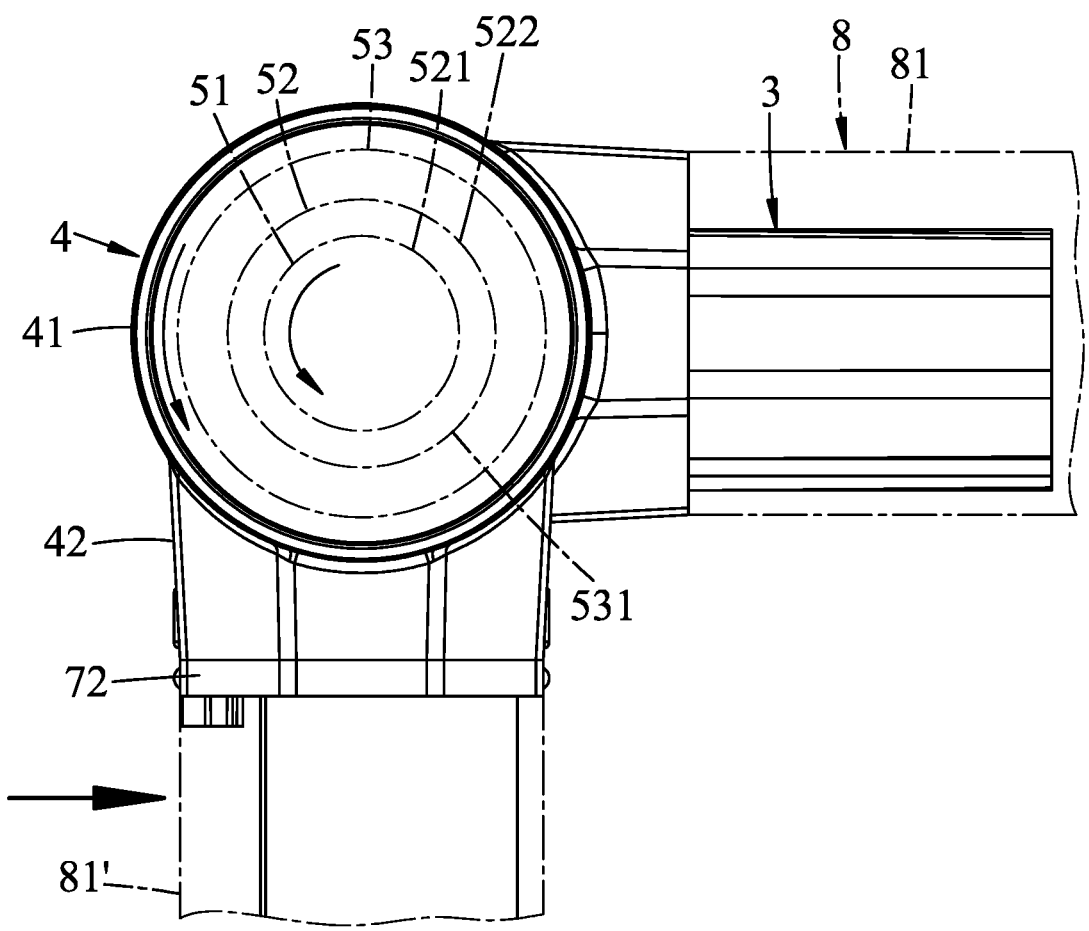
FIG. 8 is a schematic view of the embodiment as viewed from the left side of FIG. 5, illustrating how a rotating seat of this embodiment can drive a rotating shaft to rotate in a counterclockwise direction relative to a one-way bearing when the rotating seat is rotated in the counterclockwise direction.

FIG. 8 is a schematic view of the embodiment as viewed from the left side of FIG. 5. As shown in FIG. 8, when the rotating seat 4 is rotated in a counterclockwise direction relative to the casing seat 3, the rotating seat 4 can drive the rotating shaft 51 to rotate in the counterclockwise direction relative to the one-way bearing 52. When rotation of the rotating seat 4 is stopped, the rotating seat 4 can be positioned through the friction between the inner friction surface 521 of the one-way bearing 52 and the rotating shaft 51.

Figure 9:
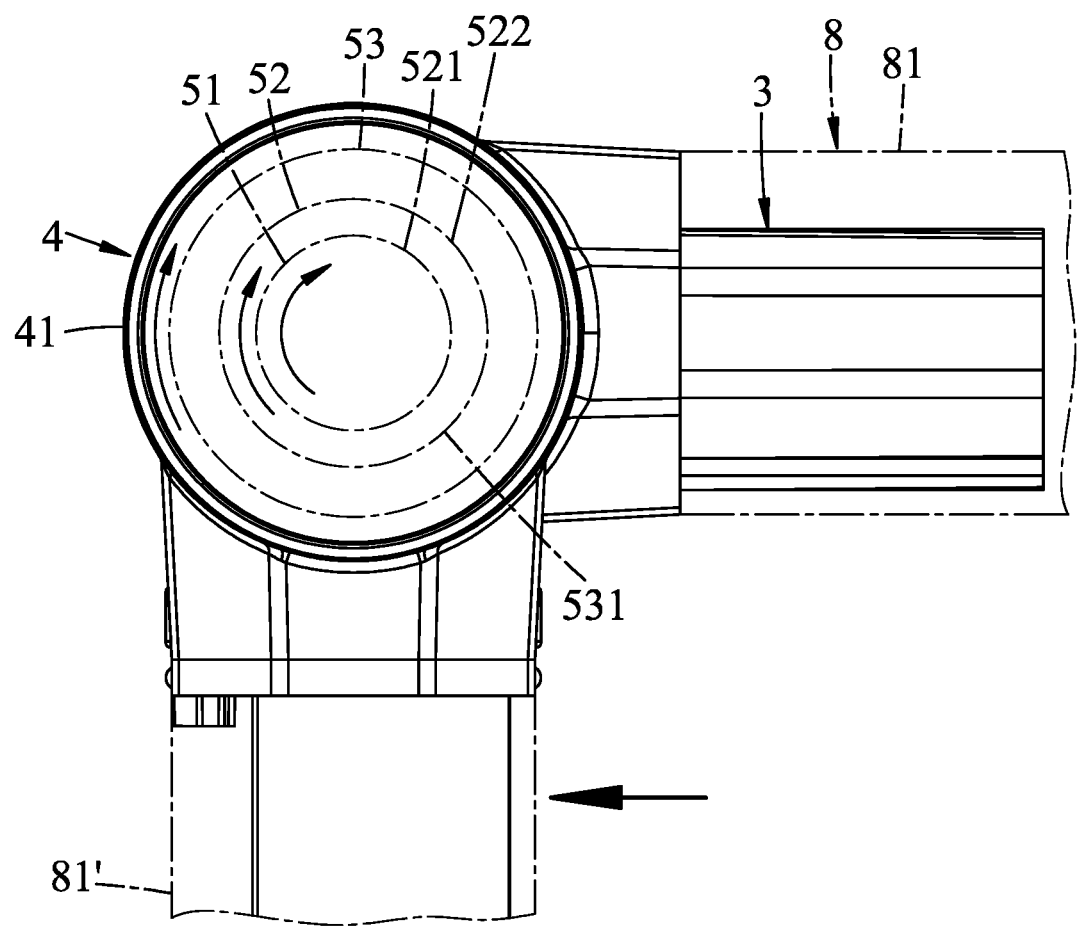
FIG. 9 is a view similar to FIG. 8, but illustrating how the rotating seat can drive the rotating shaft and the one-way bearing to simultaneously rotate in a clockwise direction relative to a tightening member when the rotating seat is rotated in the clockwise direction.

FIG. 9 is a view similar to FIG. 8. As shown in FIG. 9, when the rotating seat 4 is rotated in a clockwise direction relative to the casing seat 3, because the one-way bearing 52 cannot rotate in the counterclockwise direction, the rotating seat 4 can drive the rotating shaft 51 and the one-way bearing 52 to rotate in the clockwise direction relative to the tightening member 53 after overcoming the friction between the outer friction surface 522 of the one-way bearing 52 and the inner peripheral surface 531 of the tightening member 53. When rotation of the rotating seat 4 is stopped, the rotating seat 4 can be positioned through the friction between the outer friction surface 522 of the one-way bearing 52 and the inner peripheral surface 531 of the tightening member 53.

Figure 10:
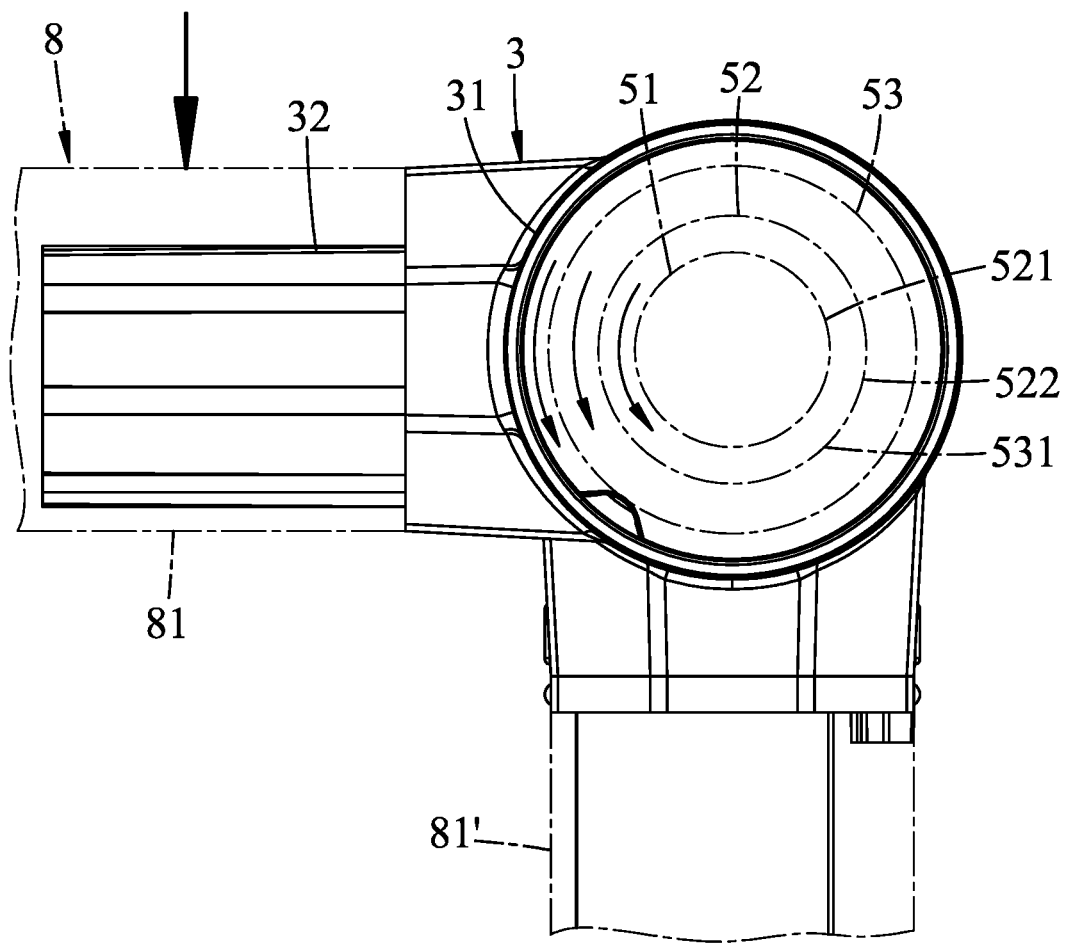
FIG. 10 is a schematic view of the embodiment as viewed from the right side of FIG. 5, illustrating how the casing seat of this embodiment can drive the tightening member and the one-way bearing to simultaneously rotate in a counterclockwise direction relative to the rotating shaft when the casing seat is rotated in the counterclockwise direction.

FIG. 10 is a schematic view of the embodiment as viewed from the right side of FIG. 5. As shown in FIG. 10, when the casing seat 3 is rotated in a counterclockwise direction relative to the rotating seat 4, the casing seat 3 can drive the tightening member 53 and the one-way bearing 52 to rotate in the counterclockwise direction relative to the rotating shaft 51. When rotation of the casing seat is stopped, the casing seat 3 can be positioned through the friction between the inner friction surface 521 of the one-way bearing 52 and the rotating shaft 51.

Figure 11:
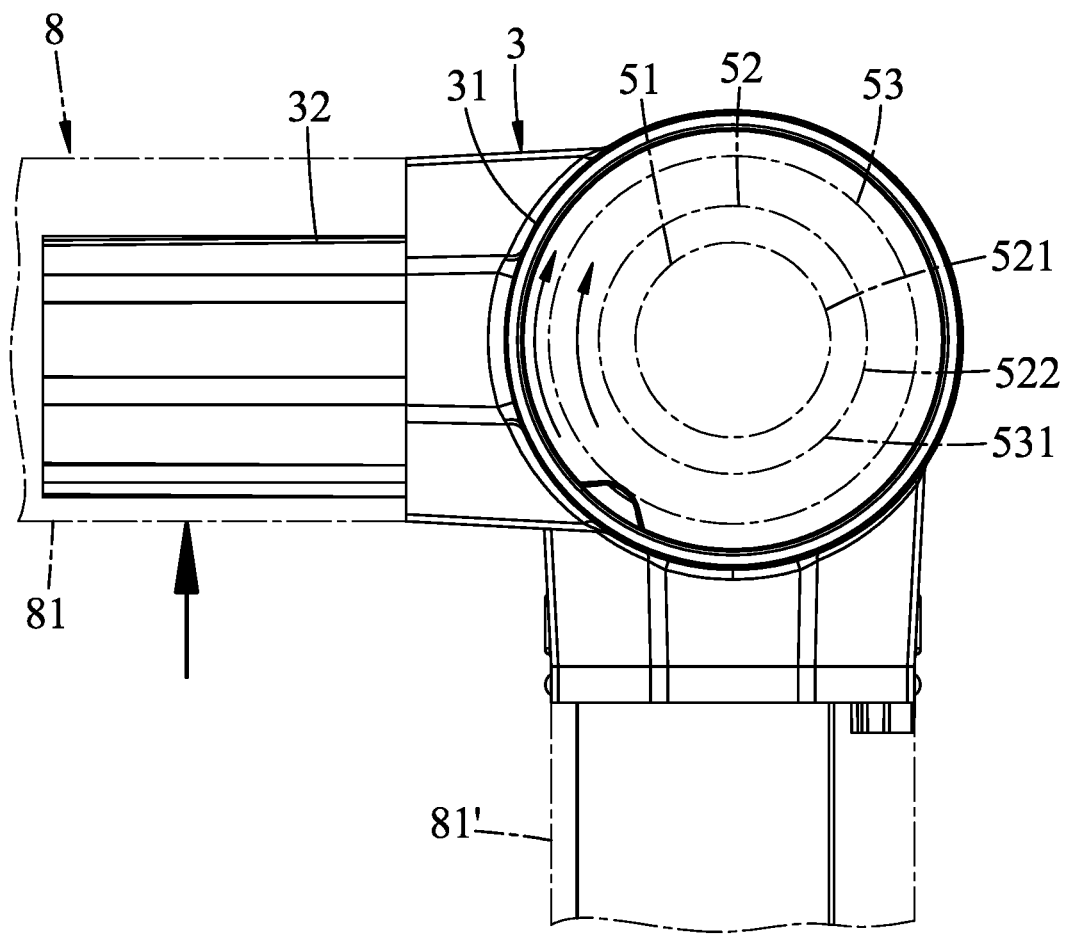
FIG. 11 is a view similar to FIG. 10, but illustrating how the casing seat can drive the tightening member to rotate in a clockwise direction relative to the one-way bearing when the casing seat is rotated in the clockwise direction.

FIG. 11 is a view similar to FIG. 10. As shown in FIG. 11, when the casing seat 3 is rotated in a clockwise direction relative to the rotating seat 4, because the one-way bearing 52 cannot rotate in the clockwise direction, the casing seat 3 can only drive the tightening member 53 to rotate in the clockwise direction relative to rotating shaft 51 after overcoming the friction between the outer friction surface 522 of the one-way bearing 52 and the inner peripheral surface 531 of the tightening member 53. When rotation of the casing seat 3 is stopped, the casing seat 3 can be positioned through the friction between the tightening member 53 and the one-way bearing 52.

Thus, in this disclosure, after the rotating seat 4 or the casing seat 3 is rotated to a desired angle, the friction between the components can be used to achieve the positioning thereof, so that use of this disclosure is easy and convenient.

Figure 12:
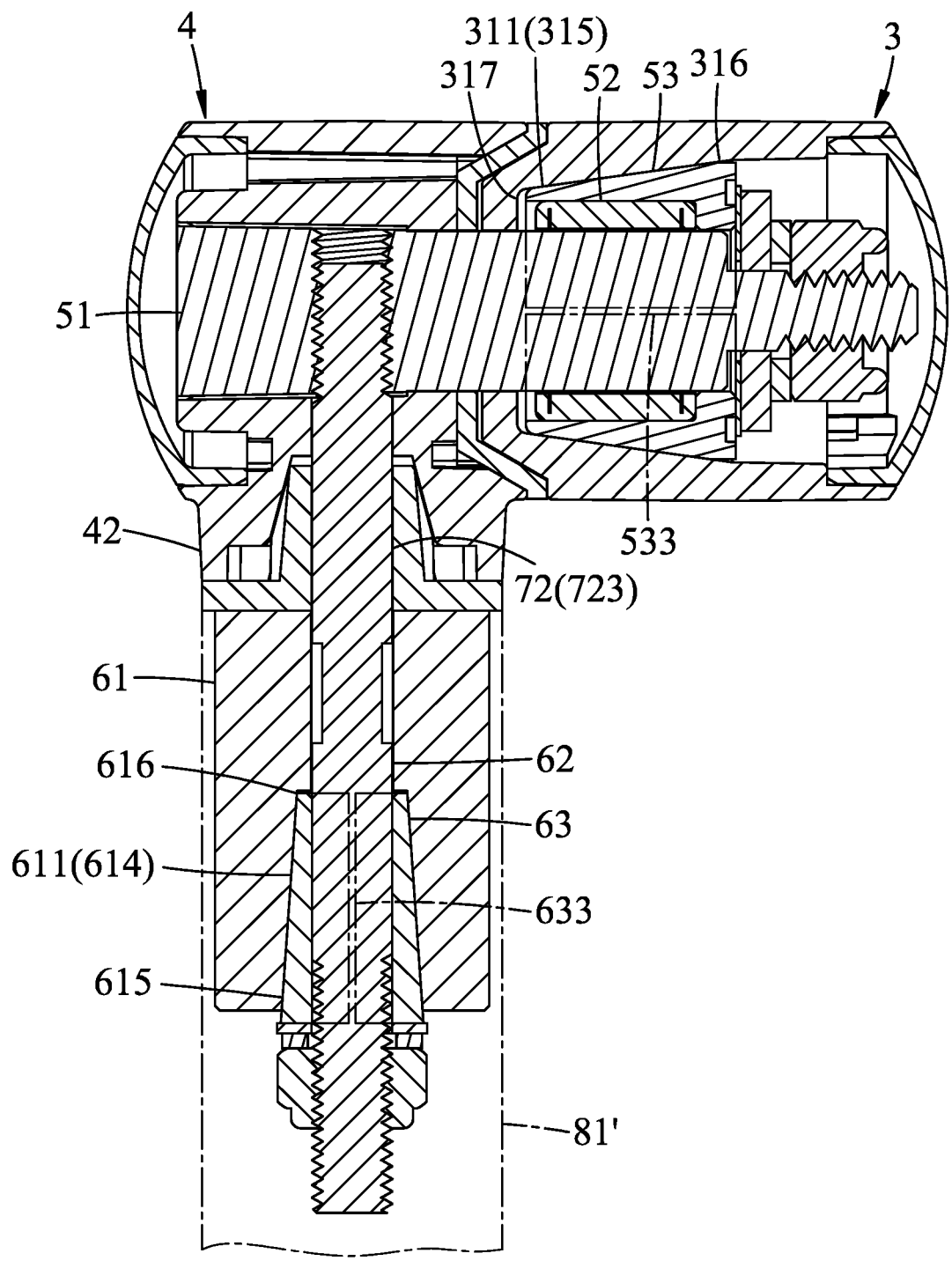
FIG. 12 is a view similar to FIG. 5, but illustrating how a gap of the tightening member and a gap of a tightening ring are reduced when the tightening member is moved into the casing seat and when the tightening ring is moved into a fixed block of a rotary shaft unit, respectively.

Referring to FIG. 12, in combination with FIGS. 5 and 6, additionally, the outer peripheral surface 532 of the tightening member 53 has a shape matching that of the tapered portion 315 of the mounting hole 312. When the tightening member 53 gradually moves between the inner surface 311 of the tubular portion 31 of the casing seat 3 and the one-way bearing 52 from the large diameter end 316 to the small diameter end 317 of the tapered portion 315 of the mounting hole 312, the gap 533 thereof gradually reduces, thereby changing the friction between the tightening member 53 and the tubular portion 31 of the casing seat 3 and between the tightening member 53 and the one-way bearing 52. Hence, in this embodiment, the friction between the tightening member 53 and the tubular portion 31 of the casing seat 3 and between the tightening member 53 and the one-way bearing 52 can be adjusted by adjusting the size of the gap 533.

Referring back to FIGS. 3, 5 and 7, the rotary shaft unit 6 has one end fixedly connected to the rotating seat unit 2 and the shaft assembly 5, and the other end configured to be connected to the support arm 81'. The rotary shaft unit 6 includes a fixed block 61, a rotary shaft 62, and a tightening ring 63.

The fixed block 61 is configured to be inserted into the support arm 81', and has an inner wall surface 612 surrounding the rotation axis (L1) and defining a tightening hole 611. The tightening hole 611 has an insertion section 613 proximate to the rotating seat 4, and a tapered section 614 connected to the insertion section 613 and distal to the rotating seat 4. The tapered section 614 has a large diameter end 615 distal to the rotating seat 4, and a small diameter end 616 proximate to the insertion section 613 and having a diameter smaller than that of the large diameter end 615 but larger than that of the insertion section 613. In this embodiment, the tapered section 614 tapers from the large diameter end 615 to the small diameter end 616.

The rotary shaft 62 has a threaded end 621 extending into the rotating seat 4 after passing through the tightening hole 611 to connect with the threaded hole 513 of the rotating shaft 51. With the rotary shaft 62 fixedly connected to the rotating shaft 51, the rotary shaft 62 can rotate with the rotating seat unit 2 relative to the fixed block 6 about the rotation axis (L1), so that the rotating seat unit 2 can rotate relative to the support arm 81' about the rotation axis (L1).

The tightening ring 63 is sleeved on the rotary shaft 62 and is press-fitted into the tapered section 614 of the tightening hole 611. The tightening ring 63 has a C-shaped body with a gap 633 between two ends thereof. The tightening ring 63 has an inner annular surface 631 frictionally engaged with the rotary shaft 62, and an outer annular surface 632 radially opposite to the inner annular surface 631 and pressed against the inner wall surface 612 of the fixed block 61.

When the rotating seat unit 2 is rotated together with the rotary shaft 62 relative to the support arm 81' about the rotation axis (L1) to a desired angle, a force greater than the friction between the inner annular surface 631 of the tightening ring 63 and the rotary shaft 62 must be applied to rotate the rotary shaft 62 relative to the tightening ring 63, so that the rotating seat unit 2 can rotate therewith relative to the tightening ring 63 to the desired angle. When the force is removed, the positioning of the rotating seat unit 2 relative to the support arm 81' can be achieved through the friction between the inner annular surface 631 of the tightening ring 63 and the rotary shaft 62. Hence, use of this disclosure is easy and convenient.

With reference to FIGS. 5 and 12, the tightening ring 63 has a shape matching that of the tapered section 614 of the tightening hole 611. When the tightening ring 63 is gradually inserted from the large diameter end 615 to the small diameter end 616 of the tightening hole 611, the gap 633 thereof gradually reduces, thereby changing the friction between the tightening ring 63 and the rotary shaft 62. Hence, in this embodiment, the friction between the tightening ring 63 and the rotary shaft 62 can be adjusted by adjusting the size of the gap 633.

Figure 13:
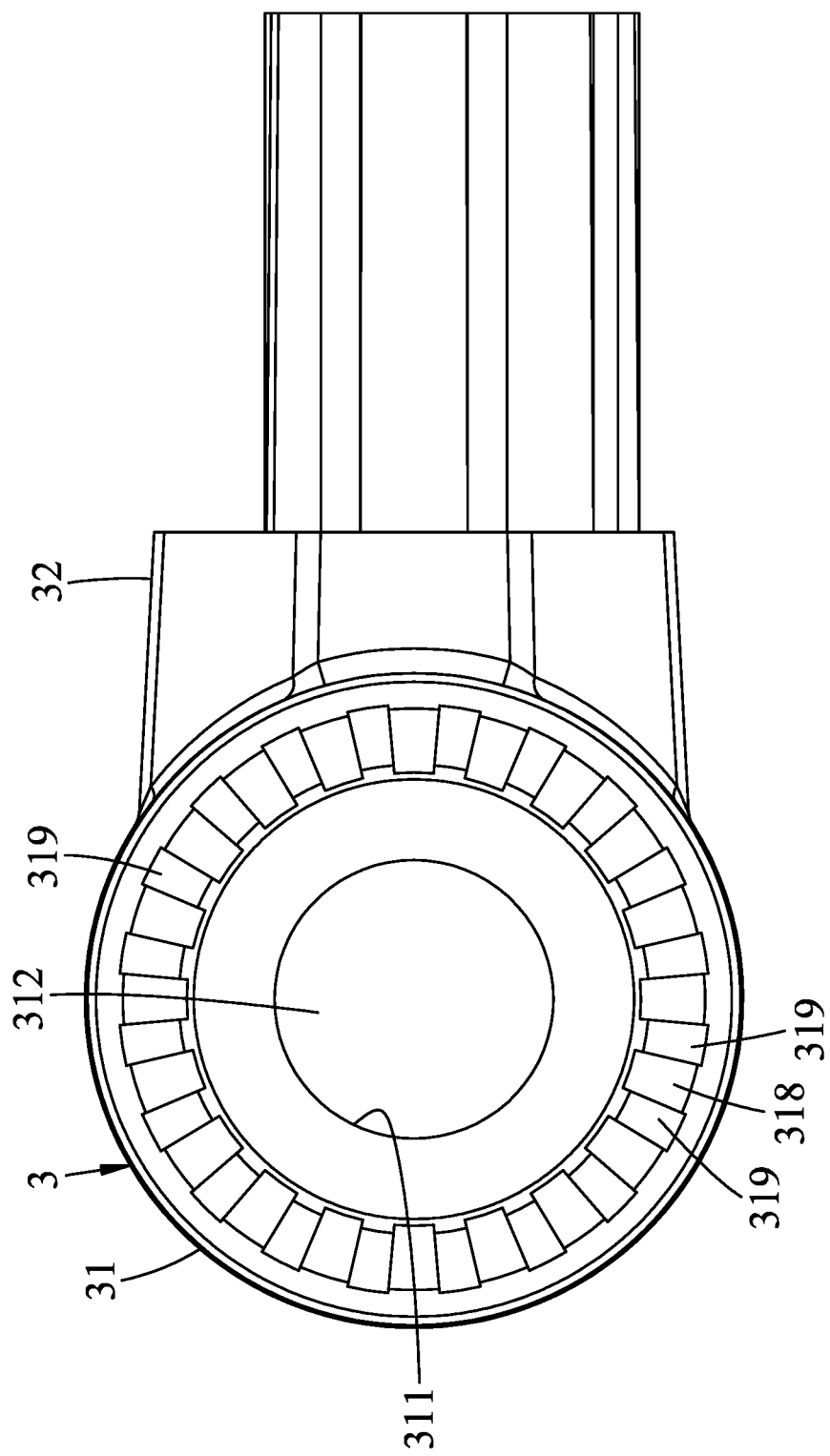
FIG. 13 is a side view of the casing seat of this embodiment.

Referring to FIG. 13, in combination with FIGS. 3 and 5, the resistance unit 7 includes a washer 71 disposed between the casing seat 3 and the rotating seat 4, and a hollow plug 72 disposed between the rotating seat 4 and the fixed block 61.

The washer 71 is sleeved on the rotating shaft 51, and is frictionally engaged between the casing seat 3 and the rotating seat 4 for increasing rotational friction between the casing seat 3 and the rotating seat 4. The washer 71 has an annular plate 710, and an annular inclined flange 711 extending outwardly and inclinedly from an outer periphery of the annular plate 710 toward the casing seat 3. The casing seat has an annular rim 318 protruding outwardly therefrom and having a shape matching that of the annular inclined flange 711 for abutment therewith. The annular rim 318 has a plurality of protrusions 319 angularly arranged on an outer surface thereof for abutting against the annular inclined flange 711 and for increasing the rotational friction between the casing seat 3 and the rotating seat 4.

Figure 14:
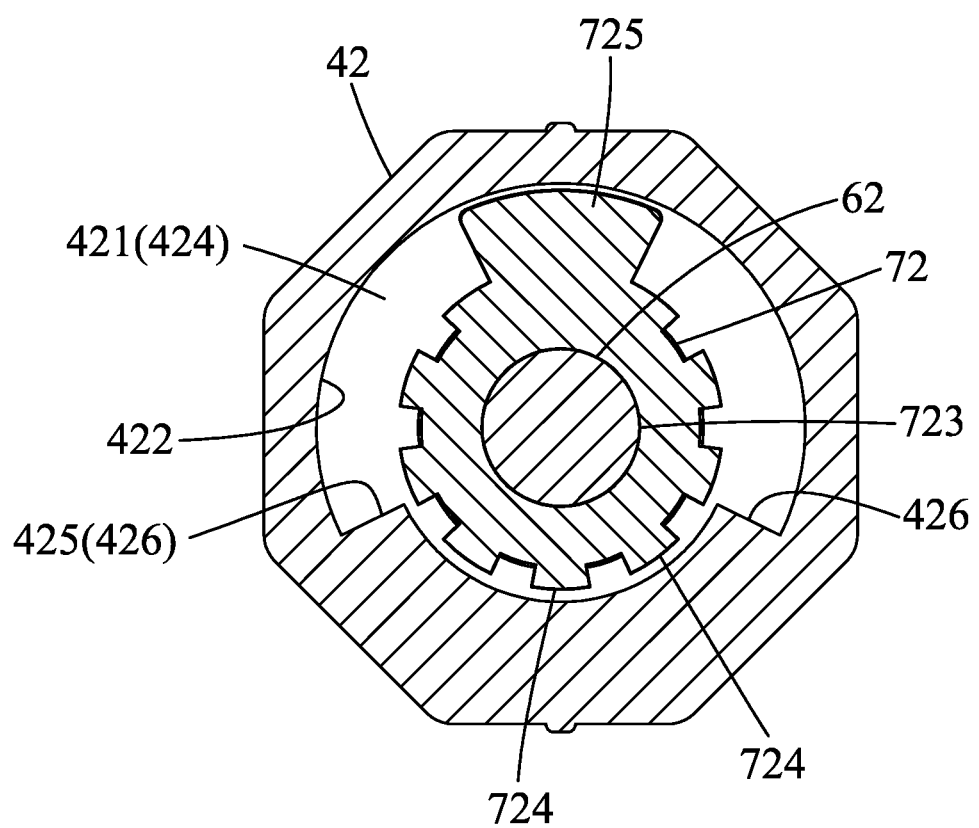
FIG. 14 is a sectional view taken along line XIV-XIV of FIG. 5.

Referring to FIG. 14, in combination with FIGS. 5 and 7, the receiving groove 421 of the rotating portion 42 of the rotating seat 4 has a receiving section 423 tapering inwardly in a direction away from the fixed block 61, and a limiting section 424 connected to the receiving section 423 and proximate to the fixed block 61.

The plug 72 is sandwiched between the rotating portion 42 of the rotating seat 4 and the fixed block 61, and has a fixed portion 721 fixed to the fixed block 61, a resistance portion 722 extending from the fixed portion 721 toward the rotating portion 42 and inserted into the receiving groove 421, and a contact hole 723 extending through the fixed portion 721 and the resistance portion 722 along the rotation axis (L1). The rotary shaft 62 extends through and frictionally engages the contact hole 723. The resistance portion 722 has a plurality of angularly spaced-apart projections 724 for abutting against the inner surrounding surface 422 of the rotating portion 42 to increase the friction when the rotating seat 4 rotates relative to the plug 72.

When the rotating seat unit 2 rotates together with the rotary shaft 62 relative to the support arm 81' about the rotation axis (L1), the rotary shaft 62 and the rotating seat 4 will also simultaneously rotate relative to the plug 72. Through the friction between the resistance portion 722 of the plug 72 and the rotating portion 42 of the rotating seat 4 and between the contact hole 723 of the plug 72 and the rotary shaft 62, the frictional resistance when the rotating seat unit 2 rotates relative to the support arm 81' can be increased to thereby increase the positioning effect thereof.

Further, the fixing portion 721 of the plug 72 has a protuberance 725 extending toward the rotating portion 42. The inner surrounding surface 422 of the rotating portion 42 is formed with a blocking piece 425 extending in a circumferential direction and located in the limiting section 424 of the receiving groove 421. The blocking piece 425 has two blocking ends 426 circumferentially opposite to each other for abutment with the protuberance 725 of the plug 72. Through this, the angular range of rotation of the rotating seat unit 2 relative to the support arm 81' can be limited.

In this disclosure, with the inner annular surface 631 of the tightening ring 63 frictionally engaging with the rotary shaft 62, a force greater than the friction between the inner annular surface 631 of the tightening ring 63 and the rotary shaft 62 must be applied to rotate the rotating seat unit 2 to the desired angle. When the force is removed, the positioning of the rotating seat unit 2 at the desired angle can be achieved through the friction between the inner annular surface 631 of the tightening ring 63 and the rotary shaft 62. Compared with the prior art, this disclosure has an effect of being easy to use. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A joint device configured to be rotatably disposed between at least two support arms of a support frame, comprising:
   a rotating seat unit configured to be connected to a first one of the support arms and configured to be rotatable relative to a second one of the support arms about a rotation axis;
   a rotary shaft unit having a first end fixedly connected to said rotating seat unit, and a second end configured to be connected to the second one of the support arms, said rotary shaft unit including a fixed block, a rotary shaft and a tightening ring, said fixed block being configured to be inserted into the second one of the support arms and having an inner wall surface that surrounds the rotation axis and that defines a tightening hole, said tightening hole having a tapered section with a first diameter end and a second diameter end, said second diameter end having a diameter smaller than a diameter of said first diameter end, said rotary shaft being fixed to said rotating seat unit and being inserted into said tightening hole, said rotary shaft being rotatable with said rotating seat unit relative to said fixed block about the rotation axis, said tightening ring being sleeved on said rotary shaft and being press-fitted into said tapered section of said tightening hole, said tightening ring having a C-shaped body with a gap between two ends thereof, said tightening ring having a shape matching a shape of said tapered section of said tightening hole and having an inner annular surface frictionally engaged with said rotary shaft, and an outer annular surface radially opposite to said inner annular surface and pressed against said inner wall surface of said fixed block, wherein said gap of said tightening ring gradually reduces when said tightening ring is gradually inserted from said first diameter end to said second diameter end of said tightening hole; and
   a resistance unit which includes a hollow plug sandwiched between said rotating seat unit and said fixed block, said rotary shaft extending through and frictionally engaging said hollow plug;
   wherein said rotating seat unit has a rotating portion extending toward said fixed block, said rotating portion having an inner surrounding surface that surrounds the rotation axis and that defines a receiving groove for extension of said rotary shaft therethrough, said receiving groove having a receiving section that tapers inwardly in a direction away from said fixed block, said hollow plug having a fixed portion fixed to said fixed block, a resistance portion extending from said fixed portion toward said rotating portion and inserted into said receiving groove, and a contact hole extending through said fixed portion and said resistance portion along the rotation axis and frictionally engaged with said rotary shaft.

2. The joint device as claimed in claim 1, wherein said resistance portion of said hollow plug has a plurality of angularly spaced-apart projections for abutting against said inner surrounding surface of said rotating portion.

3. The joint device as claimed in claim 1, wherein said fixed portion of said hollow plug has a protuberance extending toward said rotating portion, said receiving groove further having a limiting section connected to said receiving section, said inner surrounding surface of said rotating portion being formed with a blocking piece extending in a circumferential direction and located in said limiting section, said blocking piece having two blocking ends circumferentially opposite to each other for abutment with said protuberance.

4. A joint device configured to be rotatably disposed between at least two support arms of a support frame, comprising:
   a rotating seat unit configured to be connected to a first one of the support arms and configured to be rotatable relative to a second one of the support arms about a rotation axis; and
   a rotary shaft unit having a first end fixedly connected to said rotating seat unit, and a second end configured to be connected to the second one of the support arms, said rotary shaft unit including a fixed block, a rotary shaft and a tightening ring, said fixed block being configured to be inserted into the second one of the support arms and having an inner wall surface that surrounds the rotation axis and that defines a tightening hole, said tightening hole having a tapered section with a first diameter end and a second diameter end, said second diameter end having a diameter smaller than a diameter of said first diameter end, said rotary shaft being fixed to said rotating seat unit and being inserted into said tightening hole, said rotary shaft being rotatable with said rotating seat unit relative to said fixed block about the rotation axis, said tightening ring being sleeved on said rotary shaft and being press-fitted into said tapered section of said tightening hole, said tightening ring having a C-shaped body with a gap between two ends thereof, said tightening ring having a shape matching a shape of said tapered section of said tightening hole and having an inner annular surface frictionally engaged with said rotary shaft, and an outer annular surface radially opposite to said inner annular surface and pressed against said inner wall surface of said fixed block, wherein said gap of said tightening ring gradually reduces when said tightening ring is gradually inserted from said first diameter end to said second diameter end of said tightening hole;

wherein said rotating seat unit defines a joint axis perpendicular to the rotation axis, and includes a casing seat surrounding the joint axis and configured to be connected to the first one of the support arms, and a rotating seat connected to said casing seat along the joint axis, said rotating seat and said casing seat being rotatable relative to each other about the joint axis; and wherein:

said casing seat has an inner surface surrounding the joint axis and defining a mounting hole that extends through two opposite ends thereof, said mounting hole having a tapered portion with a first diameter end and a second diameter end opposite to each other along the joint axis, said second diameter end of said tapered portion having a diameter smaller than a diameter of said first diameter end of said tapered portion;

said joint device further comprises a shaft assembly connected to said rotary shaft unit, said shaft assembly including a rotating shaft, a one-way bearing, and a tightening member;

said rotating shaft extends into said rotating seat and said casing seat along the joint axis for connection of said rotary shaft therewith, said rotating shaft being rotatable with said rotating seat relative to said casing seat about the joint axis;

said one-way bearing is sleeved on said rotating shaft and is located in said tapered portion of said mounting hole, said one-way bearing having an inner friction surface frictionally engaged with said rotating shaft, and an outer friction surface radially opposite to said inner friction surface;

said tightening member is inserted into said tapered portion of said mounting hole and is press-fitted between said inner surface of said casing seat and said one-way bearing, said tightening member having a C-shaped body with a gap between two ends thereof, said tightening member having an inner peripheral surface frictionally engaged with said outer friction surface of said one-way bearing, and an outer peripheral surface radially opposite to said inner peripheral surface and pressed against said inner surface of said casing seat, said outer peripheral surface of said tightening member having a shape matching a shape of said tapered portion of said mounting hole; and said gap of said tightening member gradually reduces when said tightening member gradually moves between said inner surface of said casing seat and said one-way bearing from said first diameter end to said second diameter end of said tapered portion of said mounting hole.

5. The joint device as claimed in claim 4, further comprising a resistance unit which includes a washer frictionally engaged between said casing seat and said rotating seat for increasing rotational friction between said casing seat and said rotating seat.

6. A joint device configured to be rotatably disposed between at least two support arms of a support frame, comprising:

a rotating seat unit configured to be connected to a first one of the support arms and configured to be rotatable relative to a second one of the support arms about a rotation axis, said rotating seat unit defining a joint axis perpendicular to the rotation axis, and including a casing seat surrounding the joint axis and configured to be connected to the first one of the support arms, and a rotating seat connected to said casing seat along the joint axis, said rotating seat and said casing seat being rotatable relative to each other about the joint axis;

a rotary shaft unit having a first end fixedly connected to said rotating seat unit, and a second end configured to be connected to the second one of the support arms, said rotary shaft unit including a fixed block, a rotary shaft and a tightening ring, said fixed block being configured to be inserted into the second one of the support arms and having an inner wall surface that surrounds the rotation axis and that defines a tightening hole, said tightening hole having a tapered section with a first diameter end and a second diameter end, said second diameter end having a diameter smaller than a diameter of said first diameter end, said rotary shaft being fixed to said rotating seat unit and being inserted into said tightening hole, said rotary shaft being rotatable with said rotating seat unit relative to said fixed block about the rotation axis, said tightening ring being sleeved on said rotary shaft and being press-fitted into said tapered section of said tightening hole, said tightening ring having a C-shaped body with a gap between two ends thereof, said tightening ring having a shape matching a shape of said tapered section of said tightening hole and having an inner annular surface frictionally engaged with said rotary shaft, and an outer annular surface radially opposite to said inner annular surface and pressed against said inner wall surface of said fixed block, wherein said gap of said tightening ring gradually reduces when said tightening ring is gradually inserted from said first diameter end to said second diameter end of said tightening hole; and a resistance unit which includes a washer frictionally engaged between said casing seat and said rotating seat for increasing rotational friction between said casing seat and said rotating seat;

wherein said washer has an annular plate, and an annular inclined flange extending outwardly and inclinedly from an outer periphery of said annular plate toward said casing seat, said casing seat having an annular rim protruding outwardly therefrom and having a shape matching a shape of said annular inclined flange for abutment therewith.

7. The joint device as claimed in claim 6, wherein said annular rim has a plurality of protrusions angularly arranged on an outer surface thereof for abutting against said annular inclined flange.

* * * * *